(12) United States Patent
Shiozaki

(10) Patent No.: US 7,387,591 B2
(45) Date of Patent: Jun. 17, 2008

(54) CONTROL METHOD FOR EXTERNAL CONTROL TYPE FAN CLUTCH

(75) Inventor: Ken Shiozaki, Susono (JP)

(73) Assignee: Usui Kokusai Sangyo Kaisha Limited (JP)

( * ) Notice: Subject to any disclaimer, the term of this patent is extended or adjusted under 35 U.S.C. 154(b) by 208 days.

(21) Appl. No.: 11/244,272

(22) Filed: Oct. 5, 2005

(65) Prior Publication Data
US 2006/0096554 A1 May 11, 2006

(30) Foreign Application Priority Data
Oct. 12, 2004 (JP) ............................. 2004-298252

(51) Int. Cl.
*B60K 23/00* (2006.01)
(52) U.S. Cl. ...................................... 477/167; 477/174
(58) Field of Classification Search ................ 477/166, 477/167, 174, 175
See application file for complete search history.

(56) References Cited

U.S. PATENT DOCUMENTS

| | | | |
|---|---|---|---|
| 2,879,755 A | 3/1959 | Weir | |
| 2,988,188 A | 6/1961 | Tauschek | |
| 3,059,745 A | 10/1962 | Tauschek | |
| 3,217,849 A | 11/1965 | Weir | |
| 3,259,221 A | 7/1966 | Godfrey | |
| 3,272,188 A | 9/1966 | Sabat | |
| 3,430,743 A | 3/1969 | Fujita et al. | |
| 3,463,282 A | 8/1969 | Fujita et al. | |
| 3,642,105 A | 2/1972 | Kikuchi | |
| 3,727,354 A | 4/1973 | La Flame | |
| 3,840,101 A | 10/1974 | Peter et al. | |
| 3,856,122 A | 12/1974 | Leichliter | |
| 3,893,555 A | 7/1975 | Elmer | |
| 3,924,585 A * | 12/1975 | Woods ................. | 192/84.961 |
| 3,964,582 A | 6/1976 | Mitchell | |
| 4,228,880 A | 10/1980 | Gee | |
| 4,238,016 A | 12/1980 | Yoshida et al. | |
| 4,281,750 A | 8/1981 | Clancey | |
| 4,403,684 A | 9/1983 | Haeck | |
| 4,505,367 A | 3/1985 | Martin | |
| 4,629,046 A | 12/1986 | Martin | |
| 4,665,694 A | 5/1987 | Brunken | |

(Continued)

FOREIGN PATENT DOCUMENTS

DE 38 10 174 A1 10/1989

(Continued)

*Primary Examiner*—Ha D. Ho
(74) *Attorney, Agent, or Firm*—Gerald E. Hespos; Anthony J. Casella

(57) ABSTRACT

A method is provided for controlling an external control type fan clutch. The method controls the On/Off of an electro-magnet-activated valve for an oil feed adjusting hole. The method uses a PID control on the basis of radiator cooling liquid temperature, fan speed, transmission oil temperature, vehicle speed, engine speed, compressor pressure of an air conditioner, and an On/Off signal of the air conditioner. Individual gains of the PID control are determined by a gain matrix containing the optimum fan speed demanded by the engine, the actual metered fan speed, and the engine speed. The PID control is made on the basis of the gains to that a control signal is outputted. The control method can improve mileage, raise the cooling efficiency of an air conditioner and suppress fan noise.

2 Claims, 4 Drawing Sheets

U.S. PATENT DOCUMENTS

| | | | |
|---|---|---|---|
| 4,667,791 A | 5/1987 | Martin et al. | |
| 4,685,549 A | 8/1987 | Brunken et al. | |
| 4,699,258 A | 10/1987 | Johnston et al. | |
| 4,796,571 A | 1/1989 | Ono et al. | |
| 4,846,331 A | 7/1989 | Ono | |
| 4,850,465 A | 7/1989 | Ono | |
| 4,903,643 A | 2/1990 | Takikawa et al. | |
| 4,930,458 A | 6/1990 | Takikawa et al. | |
| 5,004,085 A | 4/1991 | Taureg | |
| 5,018,612 A | 5/1991 | Takikawa et al. | |
| 5,060,774 A | 10/1991 | Takikawa et al. | |
| 5,090,533 A | 2/1992 | Inoue | |
| 5,101,949 A | 4/1992 | Takikawa et al. | |
| 5,109,965 A | 5/1992 | Inoue | |
| 5,119,920 A | 6/1992 | Inoue | |
| 5,125,491 A | 6/1992 | Takikawa et al. | |
| 5,139,125 A | 8/1992 | Takikawa et al. | |
| 5,232,074 A | 8/1993 | Watanabe | |
| 5,452,782 A | 9/1995 | Inoue | |
| 5,501,183 A | 3/1996 | Takayama | |
| 5,575,368 A | 11/1996 | Kikuchi et al. | |
| 5,636,719 A * | 6/1997 | Davis et al. | 192/18 A |
| 5,794,749 A | 8/1998 | Ryuu | |
| 5,881,857 A | 3/1999 | Ryuu | |
| 6,013,003 A * | 1/2000 | Boffelli et al. | 475/149 |
| 6,079,536 A | 6/2000 | Hummel et al. | |
| 6,125,981 A | 10/2000 | Ito et al. | |
| 6,247,567 B1 | 6/2001 | Watanabe | |
| 6,550,596 B2 | 4/2003 | Shiozaki et al. | |
| 6,591,174 B2 | 7/2003 | Chung et al. | |
| 6,634,476 B2 | 10/2003 | Inoue et al. | |
| 6,648,115 B2 | 11/2003 | Smith et al. | |
| 6,807,926 B2 | 10/2004 | Shiozaki et al. | |
| 6,811,009 B2 | 11/2004 | Inoue et al. | |
| 6,915,888 B2 | 7/2005 | Shiozaki et al. | |
| 7,128,690 B2 * | 10/2006 | Inoue et al. | 477/175 |
| 2003/0133242 A1 | 7/2003 | Buchholz | |
| 2004/0223851 A1 | 11/2004 | Shiozaki et al. | |
| 2005/0023100 A1 | 2/2005 | Buchholz et al. | |

FOREIGN PATENT DOCUMENTS

| | | |
|---|---|---|
| DE | 103 07 106 B3 | 10/2004 |
| EP | 0 143 260 A2 | 6/1985 |
| EP | 1 316 695 A1 | 6/2003 |
| JP | 54-25581 | 8/1979 |
| JP | 55-76226 | 6/1980 |
| JP | 57-1829 | 1/1982 |
| JP | 57-167533 | 10/1982 |
| JP | 57-179431 | 11/1982 |
| JP | 59-27452 | 7/1984 |
| JP | 62-124330 | 6/1987 |
| JP | 62-194038 | 8/1987 |
| JP | 63-182332 | 11/1988 |
| JP | 4-258529 | 9/1992 |
| JP | 9-119455 | 5/1997 |
| JP | 2003-239741 | 8/2003 |
| JP | 2004-340373 | 12/2004 |

* cited by examiner

CONTROL METHOD FOR EXTERNAL CONTROL TYPE FAN CLUTCH

BACKGROUND OF THE INVENTION

1. Field of the Invention

The present invention relates generally to a control method for an external control type fan clutch of the type, in which the fan rotations for cooling an internal combustion engine of an automobile or the like are controlled according to a change in the ambient temperature or the rotation.

2. Description of the Related Art

In the prior art, there is an external control type fan clutch of this kind (as referred to JP-C-2911623, JP-A-2003-239741 and JP-A-9-119455). A sealed casing, which is composed of a nonmagnetic case borne through a bearing on a rotary shaft having a drive disc fixed at its leading end and a cover attached to the case, has its inside partitioned by a partition into an oil reservoir chamber and a torque transmission chamber having the drive disc fitted therein. The fan clutch is provided with a dam in a portion of the inner circumference wall of the cover opposed to the outer circumference wall of the drive disc, in which the oil collects at a rotating time, and a magnetic valve member leading to the dam and disposed in the oil reservoir chamber for opening/closing an oil circulation passage formed between the torque transmission chamber and the oil reservoir chamber. On the oil reservoir chamber side of the sealed casing, an electromagnet is supported on the rotary shaft through a bearing, and the valve member is activated by the electromagnet to control the On/Off of the oil circulation passage so that the effective contact area of the oil is increased/decreased in the torque transmission clearance formed between the drive side and the driven side thereby to control the rotating torque transmission from the drive side to the driven side. In the external control type fan clutch thus configured, the On/Off of the valve member is controlled by a PID control (i.e., a feedback control method by proportion, differentiation and integration) on the basis of at least one signal of a radiator cooling liquid temperature, a fan speed, a transmission oil temperature, a vehicle speed, an engine speed, the compressor pressure of an air conditioner, and an On/Off signal of the air conditioner. In another similar external control type fan clutch controlling method, a valve member is activated by an electromagnet to control the On/Off of an oil circulation passage and in which the effective contact area of oil in a torque transmission clearance between the drive side and the driven side is increased/decreased to control the rotating torque transmission from the drive side to the driven side. In this external control type fan clutch, moreover, a ring-shaped magnetic element is arranged between the electromagnet and the valve member and is so assembled in the sealed casing that its magnetic flux may be transmitted to the valve member through the magnetic element. In this fan clutch, the fan clutch is controlled by a PID control (i.e., a feedback control method by proportion, differentiation and integration) by setting the upper limit speed for an optimum fan speed demanded by the engine side, by temporarily stopping a fan speed control signal on the basis of a speed difference among the engine speed, the fan speed and the optimum fan speed, by temporarily stopping (or cutting) the fan speed control signal on the basis of the engine acceleration or the accelerator (throttle) position acceleration, or by restricting the change in the optimum fan speed on the basis of the changing rate of the optimum fan speed (as referred to Japanese Patent Application 2004-113606).

According to the method for controlling the external control type fan clutch, as disclosed in Japanese Patent Application 2004-113606, the fan rotation can be controlled to be always confined within the satisfactory temperature range of the engine combustion efficiency by controlling the temperature of the radiator cooling liquid as a direct control parameter. The fan rotation for the satisfactory condenser cooling efficiency of the air conditioner can be kept to improve the air conditioner cooling performance by detecting the On/Off situation of the air conditioner and the compressor pressure at all times. By detecting the engine speed and the accelerator opening, moreover, the fan can be prevented from being dragged by the starting acceleration or the passing acceleration from the idling time and the noise of fan can be reduced. By making use of means for setting the upper limit speed for the optimum fan speed demanded by the engine side, for temporarily stopping (or cutting) the fan speed control signal on the basis of the speed difference among the engine speed, the fan speed and the optimum fan speed, for temporarily stopping (or cutting) the fan speed control signal on the basis of the engine acceleration or the accelerator (throttle) position acceleration, or for restricting the change in the optimum fan speed on the basis of the changing rate of the optimum fan speed, moreover, there are obtained many excellent effects not only to reduce the delay in the response to the control instruction of the fan rotation, to reduce the dragging at the time of varying the engine speed or starting the engine, and to stabilize the fan rotation behaviors but also to reduce the horsepower to be consumed by the fan (or to improve the mileage) and to reduce the fan noises.

In case the individual PID gains (or proportional gains) are constant, however, the external control type fan clutch controlling method, as disclosed in Patent Publication 4 adopting the PID control in the fan rotation control method, cannot not properly respond to variations in the demanded fan speed, the engine speed or the state of the fan clutch. Thus, the fan clutch is defective in the degraded mileage, the drop in the cooling efficiency of the air conditioner (A/C), or in that it cannot suppress the generation of fan noises due to the unnecessary dragging of the fan rotation at the acceleration time, so that it cannot optimize the fan rotation control.

SUMMARY OF THE INVENTION

The invention has been conceived to eliminate the aforementioned defects of the external control type fan clutch controlling method adopting the PID control for the fan rotation control method, and has an object to propose such a method of a higher controllability for controlling an external control type fan clutch as can properly correspond to changes in a demanded fan speed, an engine rotation and the state of the fan clutch, as can improve the mileage, as can raise the cooling efficiency of an air conditioner (A/C), and as can suppress fan noises due to a dragging.

In an external control type fan clutch controlling method, in which a valve member is activated by an electromagnet to control the On/Off of an oil circulation passage and in which the effective contact area of oil in a torque transmission clearance between the drive side and the driven side is increased/decreased to control the rotating torque transmission from the drive side to the driven side, according to the invention, there is provided a method for controlling the On/Off of the valve member by a PID control (i.e., a feedback control method by proportion, differentiation and integration) on the basis of at least one signal of a radiator cooling liquid temperature, a fan speed, a transmission oil temperature, a vehicle speed, an engine speed, the compressor pressure of an air conditioner, and an On/Off signal of the air conditioner. The controlling method is characterized in that the individual gains of the PID control are determined by a gain matrix containing the optimum fan speed demanded by the engine side, the actually metered fan speed, and the engine speed, and in that the PID control is made on the basis of the gains so that a control signal is outputted. In an external control type fan clutch controlling method, in which a valve member is activated by an electromagnet to control the On/Off of an oil circulation passage and in which the effective contact area of oil in a torque transmission clearance between the drive side and the driven side is increased/decreased to control the rotating torque transmission from the drive side to the driven side, there is also provided a method for controlling the fan clutch by a PID control (i.e., a feedback control method by proportion, differentiation and integration) by setting the upper limit speed for an optimum fan speed demanded by the engine side, by temporarily stopping a fan speed control signal on the basis of a speed difference among the engine speed, the fan speed and the optimum fan speed, by temporarily stopping the fan speed control signal on the basis of the engine acceleration or the accelerator (throttle) position acceleration, or by restricting the change in the optimum fan speed on the basis of the changing rate of the optimum fan speed. In the controlling method, the individual gains of the PID control are determined by a gain matrix containing the optimum fan speed demanded by the engine side, the actually metered fan speed, and the engine speed, and in that the PID control is made on the basis of the gains so that a control signal is outputted.

In the invention, the PID operations are performed by determining the individual gains of the PID control with the matrix which is composed of the engine speed varying with time, the actually metered fan speed and the optimum fan speed demanded from the engine side, and the control signal is outputted. As compared with the case in which the individual gains are constant, therefore, a finer control can be made according to the situation of the engine, the situation of the fan clutch and so on so that the control performance is improved better. This makes it possible to improve the cooling performance of the air conditioner drastically, to suppress the fan noises due to the dragging and to improve the mileage drastically.

DESCRIPTION OF THE PREFERRED EMBODIMENTS

Figure 1:
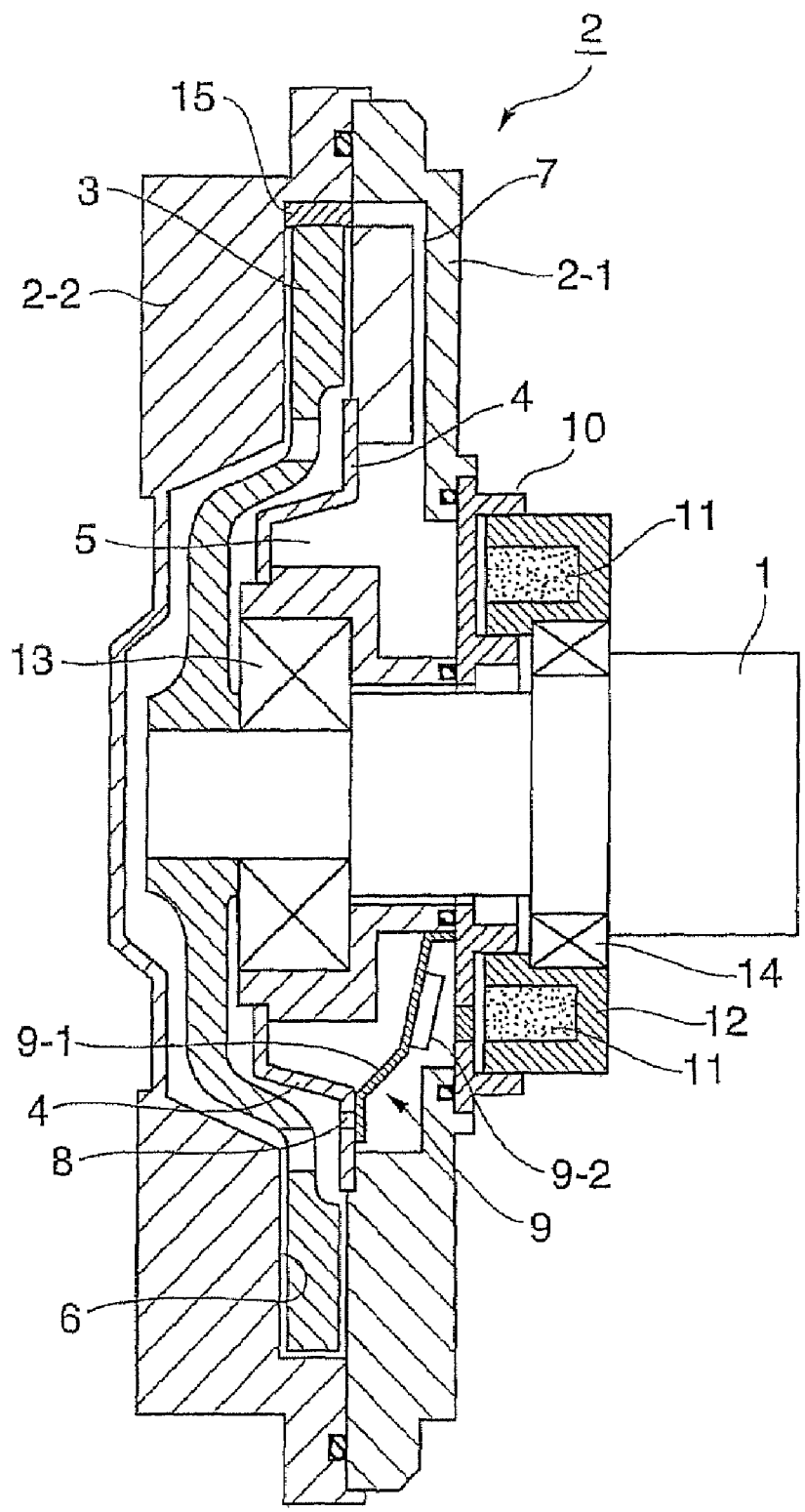
FIG. 1 is a longitudinal section showing one embodiment of an external control type fan clutch device according to the invention.

Specifically in the external control type fan clutch device shown in FIG. 1, a sealed casing 2 composed of a case 2-1 and a cover 2-2 is borne through a bearing 13 on a rotary shaft (or a drive shaft) 1 to be rotated by the drive of a drive unit (or an engine). This sealed casing 2 has its inside partitioned into an oil reservoir chamber 5 and a torque transmission chamber 6 by a partition 4 having an oil feed adjusting hole 8. In the torque transmission chamber 6, there is housed a drive disc 3, which is fixed at the leading end of the rotary shaft 1 thereby to form a torque transmission clearance between itself and the inner circumference of the torque transmission chamber.

Here, a dam 15 is formed in a portion of the inner circumference wall of the cover 2-2, as opposed to the outer circumference wall portion of the drive disc 3, at which the oil collects at the rotating time. The dam 15 has a function to pump the oil to an oil recovering circulation passage 7 formed in the case 2-1. An oil feeding valve member 9 for opening/closing the oil feed adjusting hole 8 formed in the partition 4 is composed of a leaf spring 9-1 and an armature 9-2. In order to hardly receive the resistance of the oil in the oil reservoir chamber 5 at the fan rotating time, the root end portion of the leaf spring 9-1 is so attached to the case 2-1 that the armature 9-2 of the valve member may be positioned near the rotary shaft (or the drive shaft).

On the drive unit side of the sealed casing 2, there is supported an electromagnet 11 by an electromagnet support 12, which is borne on the rotary shaft 1 through a bearing 14. At the same time, a ring-shaped magnetic loop element (or a magnet member) 10, as assembled in the case 2-1, is mounted to confront the armature 9-2 of the valve member. The electromagnet support 12 is partially fitted in the magnetic loop element 10. In order to transmit the magnetic flux of the electromagnet 11 to the armature 9-2 of the valve member, the ring-shaped magnetic loop element 10 is used to configure an activating mechanism for the oil feeding valve member 9.

When the electromagnet 11 is OFF (or not excited) in the fan clutch device thus configured, the armature 9-2 is brought away from the magnetic loop element 10 by the action of the leaf spring 9-1 so that the oil feed adjusting hole 8 is closed to stop the feed of the oil into the torque transmission chamber 6. When the electromagnet 11 is ON (or excited), the armature 9-2 is attracted toward the magnetic loop element 10 against the leaf spring 9-1 so that the leaf spring 9-1 turns to the case 2-1 to open the oil feed adjusting hole 8 thereby to feed the oil into the torque transmission chamber 6.

Figure 2:
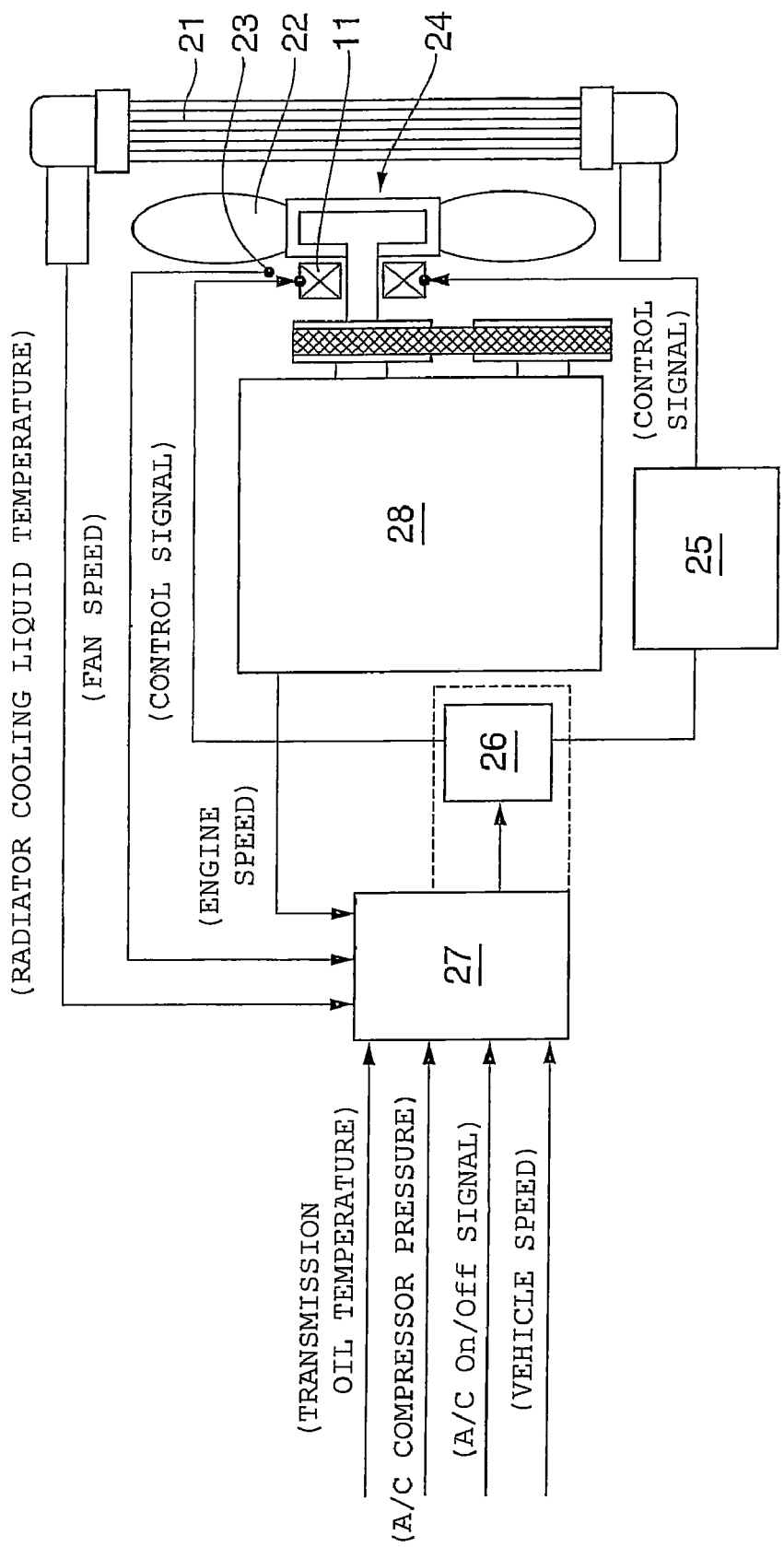
FIG. 2 is a schematic diagram showing one example of the entire configuration of a control system for carrying out a control method for the external control type fan clutch device.

With reference to FIG. 2, here is described a control system for executing the method for controlling the external control type fan clutch device thus far described.

First of all, the cooling liquid temperature (or an engine cooling water temperature) of a radiator 21, the rotational speed of a fan 22, the transmission oil temperature, the vehicle speed, the rotational speed of an engine 28, an accelerator (throttle) position, the compressor pressure of an air conditioner, the On/Off signal of the air conditioner, and so on are fetched by a main operation controller 27, and an optimum fan speed (or a fan speed range) is decided by the main operation controller. Then, a valve On/Off signal necessary for varying the fan rotation is sent either to a relay in the main operation controller 27 or to a controller (or a relay) 26 other than the main operation controller 27. This relay is switched to supply the electric power to the electromagnet 11 of the fan clutch device 24 thereby to open/close the oil feeding valve mechanism 9. In the system, the fan rotation, as varied by that oil feed of the opened/closed valve, is sensed, and the resultant data is fed back to the main operation controller 27, so that the optimum fan speed (or the fan speed range) is decided on the basis of the data containing the cooling liquid temperature of the radiator 21, the transmission oil temperature, the vehicle speed and the engine speed. In FIG. 2, numeral 23 designates a fan rotation sensor, and numeral 25 designates a battery.

Figure 3:
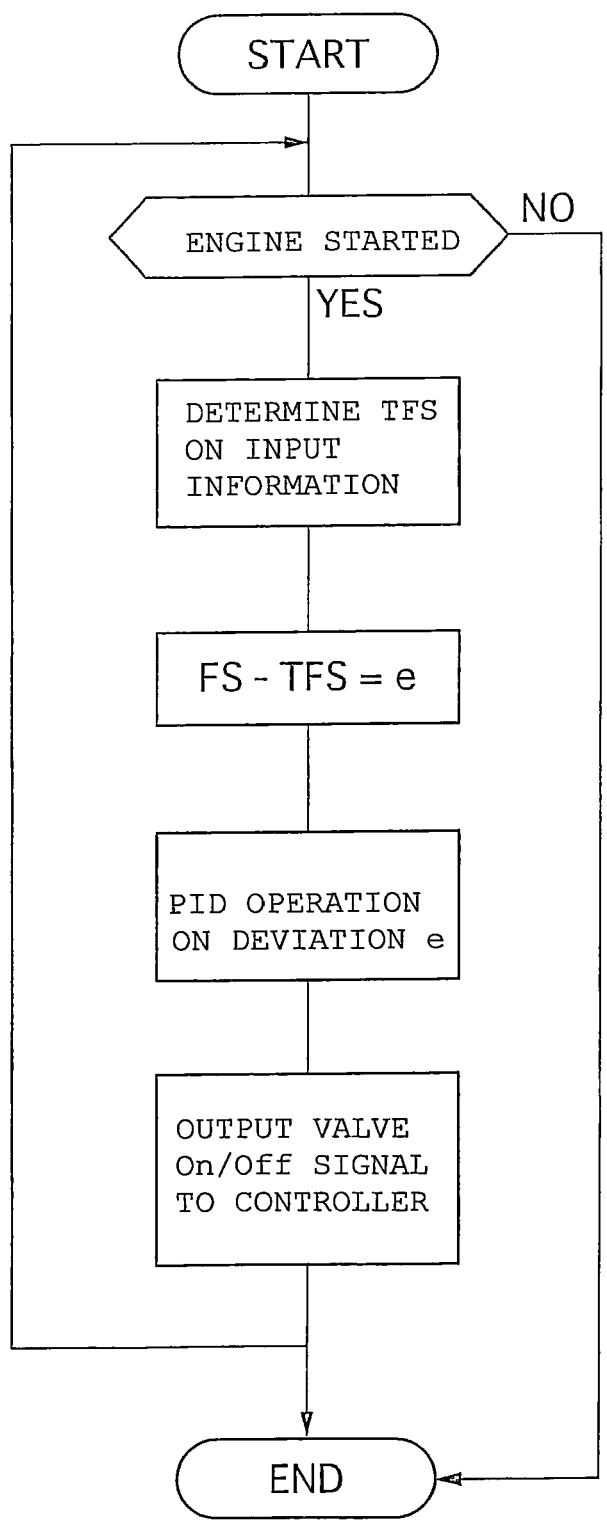
FIG. 3 is a flow chart showing one embodiment of the control method for the external control type fan clutch device.

Subsequently, the control method of the invention by the control system shown in FIG. 2 is described with reference to FIG. 3. Specifically, while the vehicle is running, the optimum fan speed (TFS) is determined on the basis of the data containing the radiator cooling liquid temperature, the transmission oil temperature, the vehicle speed and the engine speed, and a deviation e (i.e., FS−TFS=e) from the actual fan speed FS is decided. On the basis of the deviation e, the main operation controller 27 executes the PID operations to calculate the valve On/Off signal, and this valve On/Off signal (or the control output) is outputted to the controller (or relay) 26 thereby to open/close the oil feed valve of the fan clutch device 24. Here, the aforementioned PID control is described in detail. The control operation equation for the PID control is expressed by the following Formula 1:

$$y = Kp \times e + Ki \times 1/Ti \int edt + Kd \times Td \times d/dt \times e, \quad \text{(Formula 1)}$$

e: Deviation
y: Control Output
Kp, Ki, Kd: Individual Gains of PID
Ti: Time of Integration (Constant)
Td: Time of Differentiation (Constant).

Here is described the methods for determining the individual PID gains (Kp, Ki, Kd) in Formula 1.

Specifically, the individual PID gains are determined from a gain matrix (or input information) containing one, two or more of the optimum fan speed (TFS) demanded from the engine side, an engine speed (ES) and the fan speed (FS).

For example, the case (1), in which the individual PID gains (Kp, Ki, Kd) are determined by a linear matrix of the optimum fan speed (TFS), and the case (2), in which the individual PID gains (Kp, Ki, Kd) are determined by a quadratic matrix composed of the optimum fan speed (TFS) and the engine speed (ES), are enumerated in Table 1 and Table 2, respectively. Here, Table 2 exemplifies the case, in which only the Kp gain is determined, and the gains Ki and Kd are likewise determined by the quadratic matrix.

TABLE 1

| PID Gain Matrix | TFS ≦ 1000 | 1000 < TFS ≦ 1500 | 1500 < TFS ≦ 2000 | 2000 < TFS ≦ 2500 | 2500 < TFS ≦ 3000 | ... |
|---|---|---|---|---|---|---|
| Kp | 0.1 | 0.2 | 0.3 | 0.4 | 0.5 | ... |
| Ki | 0.3 | 0.2 | 0.1 | 0.2 | 0.3 | ... |
| Kd | 0.5 | 0.4 | 0.3 | 0.2 | 0.1 | ... |

TABLE 2

| PID Gain Matrix | TFS ≦ 1000 | 1000 < TFS ≦ 1500 | 1500 < TFS ≦ 2000 | 2000 < TFS ≦ 2500 | 2500 < TFS ≦ 3000 | ... |
|---|---|---|---|---|---|---|
| ES ≦ 1000 | 0.1 | — | — | — | — | ... |
| 1000 < ES ≦ 1500 | 0.2 | 0.1 | — | — | — | ... |
| 1500 < ES ≦ 2000 | 0.3 | 0.4 | 0.3 | — | — | ... |
| 2000 < ES ≦ 2500 | 0.2 | 0.3 | 0.2 | 0.1 | — | ... |
| 2500 < ES ≦ 3000 | 0.1 | 0.2 | 0.3 | 0.2 | 0.1 | ... |
| . | . | . | . | . | . | ... |

Figure 4:
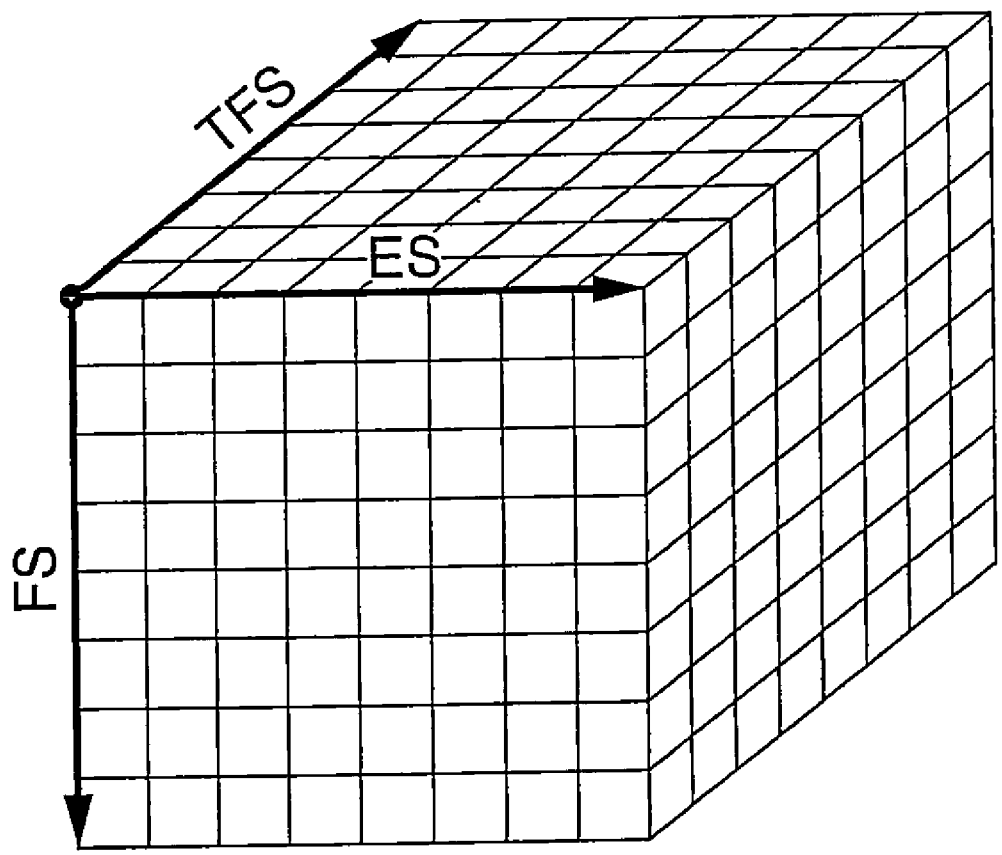
FIG. 4 is an explanatory diagram showing one example of each PID gain in the control method for the external control type fan clutch device.

In the case (3), moreover, the individual PID gains (Kp, Ki, Kd) can also be determined by a cubic matrix composed of the optimum fan speed (TFS), the engine speed (ES) and the fan speed (FS), as shown in FIG. 4. Here, FIG. 4 shows the cubic matrix of the case, in which the Kp gain matrix is determined. It is, however, natural that the PID gains Ki and Kd are also determined like Kp.

Here, the optimum fan speed (TFS), the engine speed (ES) and the fan speed (FS) used as the input information for determining the individual PID gains are general input information. It is also natural that other information can be added or substituted.

In the invention, the control performance can be better improved by increasing the input information for determining the individual PID gains to prepare a gain matrix of a higher order.

In another embodiment of the invention, moreover, the individual PID gains (Kp, Ki, Kd) can be determined by a formula using the input information (TFS, ES, FS and so on) as parameters.

In case the PID gain Kp is to be determined by using the engine speed (ES)=2,000 rpm and the optimum fan speed (TFS) =1,000 rpm, for example, the gain Kp is calculated to 0.55 by the following Formula 2. The other gains Ki and Kd are likewise determined.

$$Kp + 1000/ES + 50/TFS.$$

The invention is enabled, when applied to an automotive radiator cooling fan clutch, to improve the engine performance and the mileage, to improve the cooling performance of the air conditioner (A/C) condenser, to suppress the fan noises due to the dragging, to reduce the delay in response to the control instruction of the fan rotation, to reduce the dragging at the time of varying the engine speed or starting the engine, and to stabilize the fan rotation behaviors.

What is claimed is:
1. In an external control fan clutch controlling method, in which a valve member is activated by an electromagnet to control the On/Off of an oil circulation passage and in which an effective contact area of oil in a torque transmission clearance between a drive side and a driven side is increased/decreased to control a rotating torque transmission from the drive side to the driven side, the method comprising:
- controlling On/Off of said valve member by a PID control on the basis of at least one signal of a radiator cooling liquid temperature, a fan speed, a transmission oil temperature, a vehicle speed, an engine speed, an accelerator (throttle) position, compressor pressure of an air conditioner, and an On/Off signal of the air conditioner,
- determining individual gains of said PID control by a gain matrix containing an optimum fan speed demanded by an engine side, an actually metered fan speed, and the engine speed, and
- outputting a control signal so that the PID control is made on the basis of the determined gains.

2. In an external control fan clutch controlling method, in which a valve member is activated by an electromagnet to control the On/Off of an oil circulation passage and in which an effective contact area of oil in a torque transmission clearance between a drive side and a driven side is increased/decreased to control a rotating torque transmission from the drive side to the driven side, the method comprising:
- controlling the fan clutch by a PID control by setting an upper limit speed for an optimum fan speed demanded by an engine side, by temporarily stopping a fan speed control signal on the basis of a speed difference among an engine speed, the fan speed and said optimum fan speed, by temporarily stopping the fan speed control signal on the basis of an engine acceleration or a throttle position acceleration, or by restricting a change in said optimum fan speed on the basis of a changing rate of said optimum fan speed,
- determining individual gains of said PID control by a gain matrix containing the optimum fan speed demanded by the engine side, actually metered fan speed, and the engine speed, and
- outputting a control signal so that the PID control is made on the basis of the determined gains.

* * * * *